United States Patent [19]
Marchok et al.

[11] Patent Number: 5,912,920
[45] Date of Patent: Jun. 15, 1999

[54] POINT-TO MULTIPOINT DIGITAL COMMUNICATIONS SYSTEM FACILITATING USE OF A REDUCED COMPLEXITY RECEIVER AT EACH OF THE MULTIPOINT SITES

[76] Inventors: Daniel J. Marchok, 14984 W. Clear Lake Rd., Buchanan, Mich. 49107; Samir Kapoor, Apt. 803, Coronation Gardens, South Bend, Ind. 46637

[21] Appl. No.: 08/824,923

[22] Filed: Mar. 27, 1997

[51] Int. Cl.⁶ .................................. H04B 1/38; H04J 3/16
[52] U.S. Cl. ........................ 375/219; 375/259; 370/336; 370/498
[58] Field of Search ..................................... 375/219, 221, 375/257, 259, 261, 271, 279; 370/336, 389, 442, 458, 498

[56] References Cited

U.S. PATENT DOCUMENTS

| | | | |
|---|---|---|---|
| 5,268,933 | 12/1993 | Averbuch | 375/356 |
| 5,371,899 | 12/1994 | Kuznicki et al. | 455/34.1 |
| 5,392,287 | 2/1995 | Tiedemann, Jr. et al. | 370/498 X |
| 5,444,698 | 8/1995 | Kito | 370/336 X |
| 5,535,207 | 7/1996 | Dupont | 370/458 X |
| 5,563,889 | 10/1996 | Gard et al. | 370/336 |
| 5,610,917 | 3/1997 | Diachina | 370/469 |
| 5,790,514 | 8/1998 | Marchok et al. | 370/208 |

OTHER PUBLICATIONS

E.A. Lee and D.G. Messerschmitt, Digital Communication, Second Edition, 1994, pp. 770–779.

K.L. Kerpez, "A Comparison of QAM and VSB for Hybrid Fiber/Coax Digital Transmission," IEEE Transactions on Broadcasting vol. 41, Mar. 1995, pp. 9–16.

K. Laudel, E. Tsui, J. Harp, A. Chun, and J. Robinson, "Performance of a 256–QAM Demodulator/Equalizer in a Cable Environment," Proceedings of NCTA Convention and Exposition,.

K. Laudel, "Performance Results of a Low–cost Alternative Equalizer Architecture for 64/256–QAM Demodulation in a CATV Receiver," Proceeedings of NCTA Convention and Exposition, May 1995, pp. 227–240.

*Primary Examiner*—Young T. Tse
*Attorney, Agent, or Firm*—McAndrews, Held & Malloy, Ltd.

[57] ABSTRACT

A communications system is set forth comprising a plurality of remote receivers numbering M for receiving and demodulating respective PSK symbols received from a transmission medium. A central transmitter transmits periodically occurring frames of data to the plurality of receivers over the transmission medium. Each frame of data contains L total symbols including a subset of $X_m$ symbols designated for each one of the M plurality of remote receivers. The transmitter interleaves the $X_m$ symbols in a given frame into a plurality of periodic, non-consecutive groups of R symbols per group, wherein $R<X_m$. In accordance with one embodiment of the invention, each of the remote receivers includes an equalizer implemented as a digital filter having N taps. In such instances, the transmitter interleaves the $X_m$ symbols in a given frame into a plurality of periodic, non-consecutive groups of R symbols per group, wherein $R \leq N$.

30 Claims, 8 Drawing Sheets

5,912,920

POINT-TO MULTIPOINT DIGITAL COMMUNICATIONS SYSTEM FACILITATING USE OF A REDUCED COMPLEXITY RECEIVER AT EACH OF THE MULTIPOINT SITES

BACKGROUND OF THE INVENTION

The present invention is directed to a point-to-multipoint digital communications system. More particularly, the present invention is directed to a point-to-multipoint communication system that facilitates use of a reduced complexity receiver architecture at the multipoint sites.

Point-to-multipoint communications systems having a primary site that is coupled for communication with a plurality of secondary sites are known. Generally stated, such systems comprise a head end unit comprising a transceiver at a primary site that functions as a central communications device for communication with a plurality of transceivers at a plurality of secondary sites.

One application of such a communications system type is a cable telephony system. Cable telephony systems transmit and receive telephone call communications over the same cable transmission media as used to receive cable television signals and other cable services. One cable telephony system currently deployed and in commercial use is the Cablespan 2300 system available from Tellabs, Inc. The Cablespan 2300 system uses a head end unit that includes a primary transmitter and primary receiver disposed at a primary site. The head end unit transmits and receives telephony data to and from a plurality of remote service units that are located at respective secondary sites. This communication scheme uses TDM QPSK modulation for the data communications and can accommodate approximately thirty phone calls within the 1.9 MHz bandwidth typically allocated for such communications.

Generally, each receiver of each remote service unit receives a burst of continuous, sequential data symbols during a single, predetermined time slot occurring in each frame of data sent by the head end unit. As such, the receiver must have enough processing power to process the burst as it is received during the short burst period of each frame. Such processing power results in increased costs of the remote service units. While small point-to-multipoint systems may be able to tolerate these increased costs, the increased costs may make large scale systems uneconomical and unfeasible.

The present inventors, however, have recognized that such burst processing may be wasteful and require an undue amount of processing power. To this end, they have devised a system in which the processing power for each of the remote receivers may be substantially reduced.

BRIEF SUMMARY OF THE INVENTION

A communications system is set forth comprising a plurality of remote receivers numbering M for receiving and demodulating respective PSK modulated symbols received from a transmission medium. A central transmitter transmits periodically occurring frames of PSK modulated data to the plurality of receivers over the transmission medium. Each frame of data contains L total symbols including a subset of $X_m$ symbols respectively designated for each one of the M plurality of remote receivers. The transmitter interleaves the $X_m$ symbols for a given receiver in a given frame into a plurality of periodic, non-consecutive groups of R symbols per group, wherein $R<X_m$.

In accordance with one embodiment of the invention, each of the remote receivers includes an equalizer implemented as a digital filter having N taps. In such instances, the transmitter interleaves the $X_m$ symbols in a given frame into a plurality of periodic, non-consecutive groups of R symbols per group, wherein $R \leq N$.

DETAILED DESCRIPTION OF THE INVENTION

Figure 1:
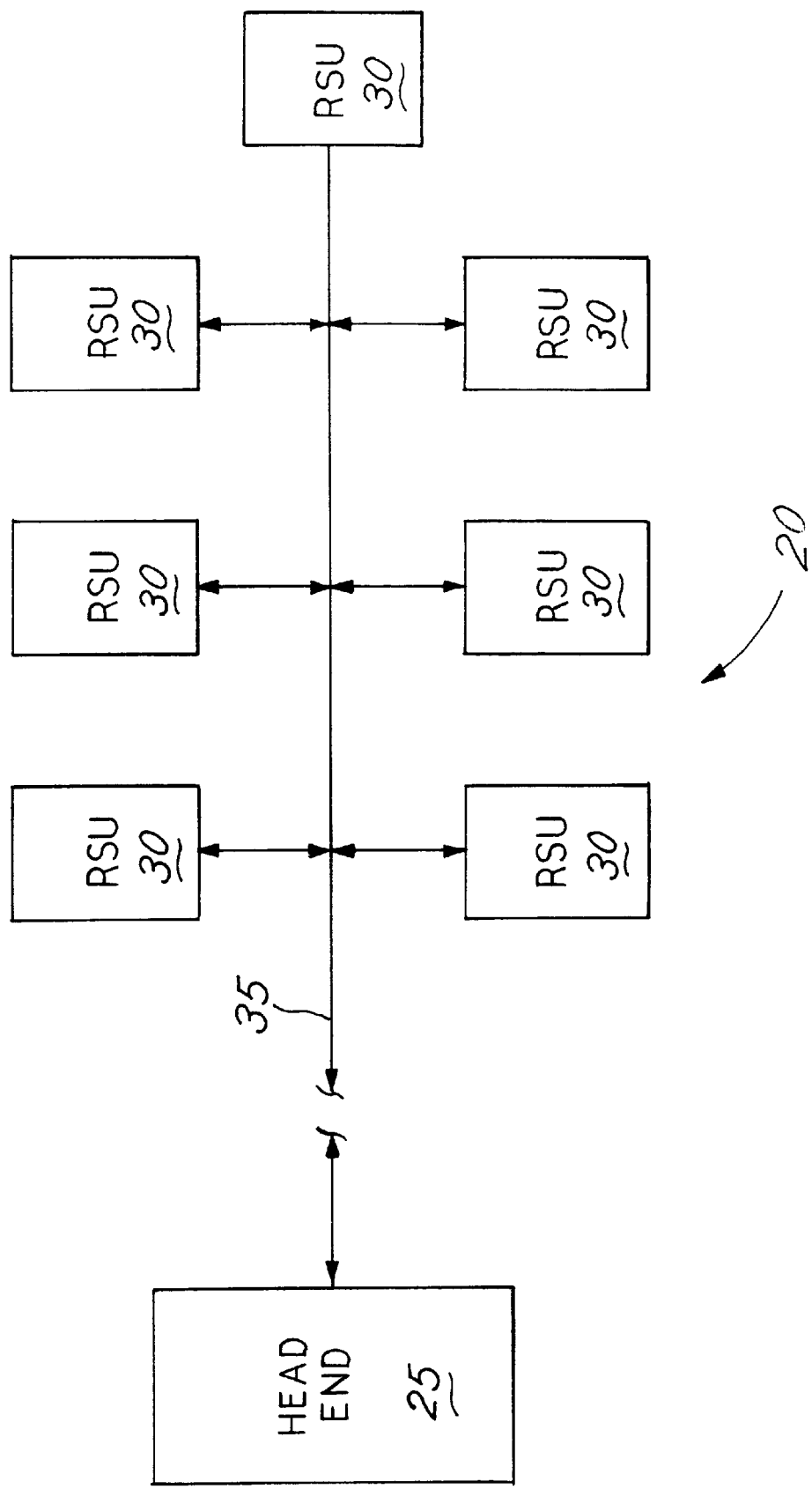
FIG. 1 is a schematic block diagram of a point-to-multipoint communications system.

FIG. 1 is a block diagram of a point-to-multipoint communications system having a remote service unit that may employ a reduced complexity receiver architecture by virtue of the transmission format disclosed herein. As illustrated, the communications system, shown generally at 20 includes a head end unit (HE) 25 disposed at a primary site. The head end unit 25 communicates with a plurality of remote service units (RSUs) 30 respectively disposed at a plurality of secondary sites, over a transmission medium 35 such as air, a coaxial cable, etc.

Figure 2:
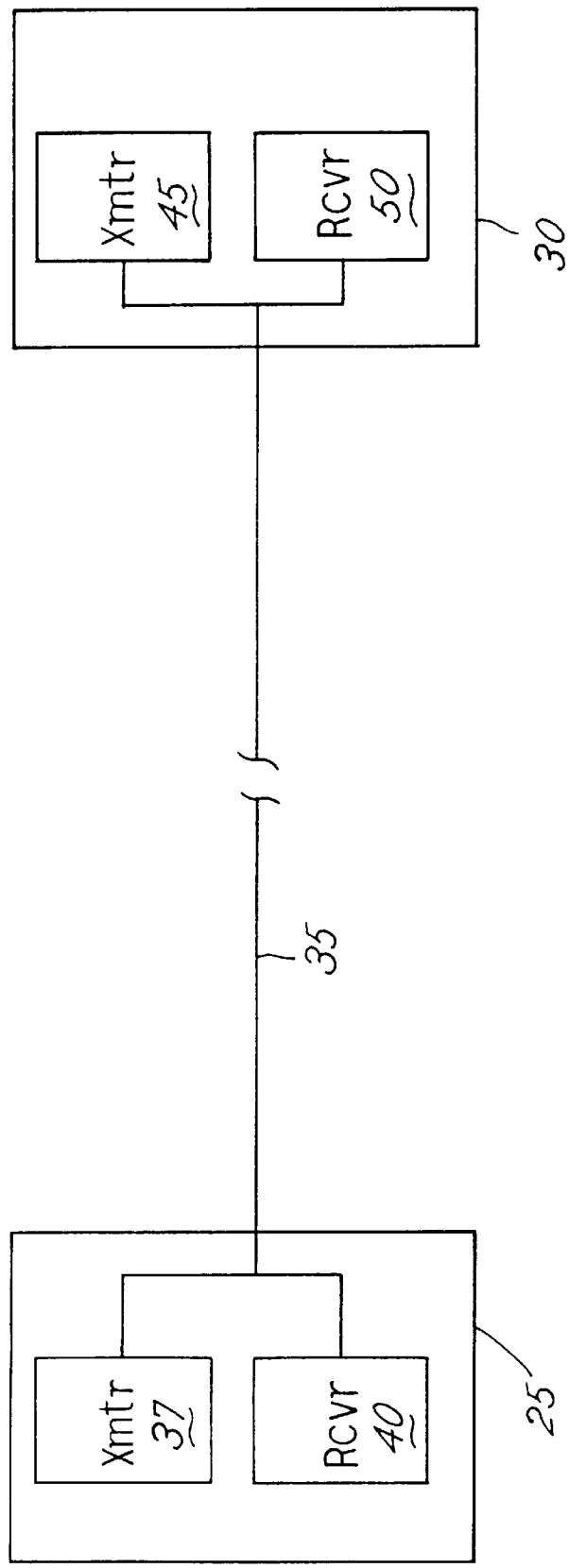
FIG. 2 is an exemplary schematic block diagram of a head end unit and a remote service unit.

As illustrated in FIG. 2, the head end unit 25 includes a transmitter 37 for transmitting digital data to the plurality of RSUs 30 and a receiver 40 for receiving digital data from the plurality of RSUs 30. Similarly, each of the RSUs 30 includes a transmitter 45 for transmitting digital data to the receiver 40 of the HE 25 and a receiver 50 for receiving digital data from the transmitter 35 of the HE 25.

The data transmitted from the HE 25 to the RSUs 30 may be modulated in accordance with any one of a number of modulation formats that generate a PSK analog symbol for each transmitted digital data unit. For the purposes of the present disclosure, the term phase shift keying (PSK) shall be construed to relate to any digital transmission modulation in which an analog signal is phase shifted to represent a corresponding digital signal.

Such modulation schemes include PSK, QPSK, QAM, etc.

One of the more efficient PSK data modulation methods is quadrature amplitude modulation (QAM). Such QAM digital data communications assign a particular amplitude and phase to a base frequency signal $f_1$. The amplitude and phase of the signal are transmitted as a symbol during a predetermined period known as the symbol period $T_{sym}$. The transmitted symbol represents one or more information data bits that are transmitted between the units 25 and 30. Each symbol constitutes a point within a "constellation", the point designating the phase and amplitude at which the given base frequency $f_1$ is transmitted.

Figure 3:
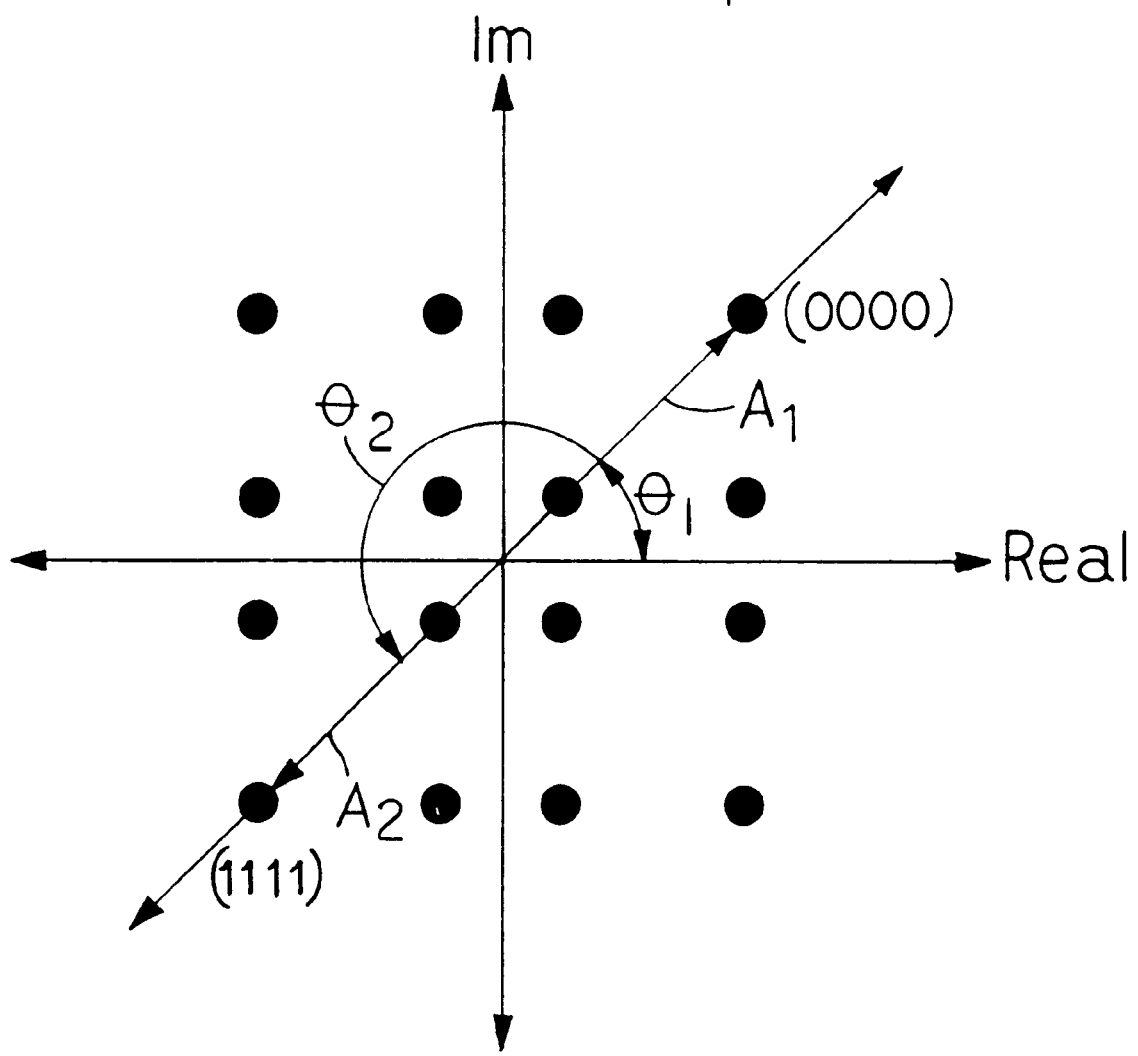
FIG. 3 is a graph illustrating a 16-point QAM constellation.

FIG. 3 illustrates the use of a sixteen constellation point QAM system. As illustrated, a symbol having a carrier signal of fixed frequency $f_1$ has its amplitude and phase varied depending on the constellation point that is to be transmitted. For example, a constellation point representing the binary states 0000 is transmitted as a symbol at a phase of $\theta_1$ and an amplitude of $A_1$ during a designated symbol time. A constellation point representing the binary states 1111, however, is transmitted as a symbol at a phase of $\theta_2$ and an amplitude of $A_2$ during a designated symbol time.

Figure 4:
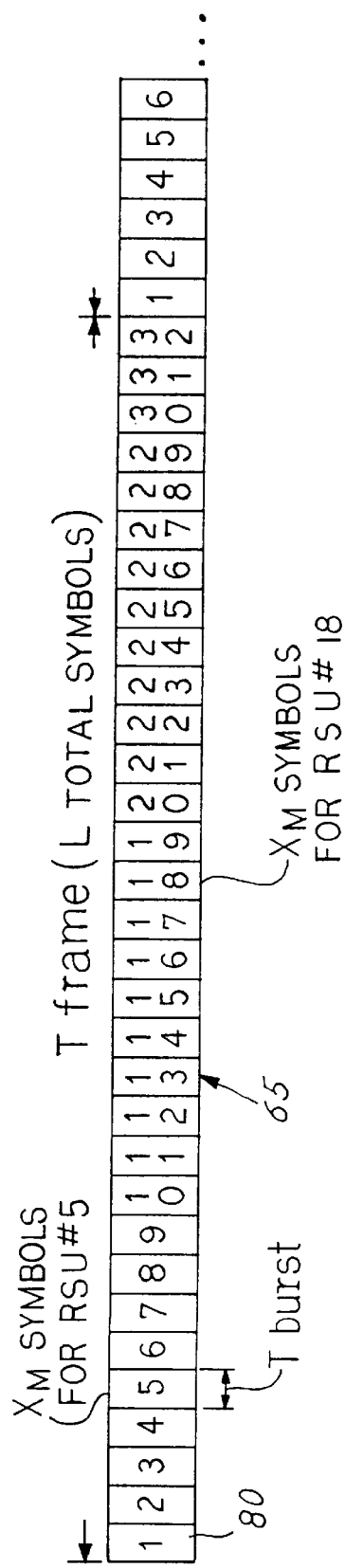
FIG. 4 illustrates one embodiment of a conventional frame of data transmitted from the head end unit to a plurality of remote service units.
Figure 5:
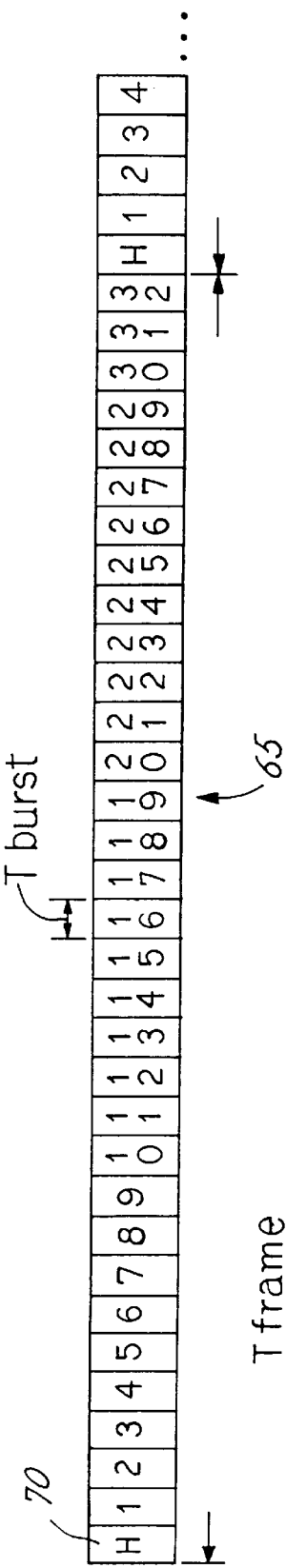
FIG. 5 illustrates a further embodiment of a conventional frame of data transmitted from the head end unit to a plurality of remote service units wherein the frame is defined by a data header.

Symbols transmitted from the head end unit 25 to the receivers 50 of the RSUs 30 are generally organized in data frames. Exemplary data frames for a 32 RSU system are illustrated in FIGS. 4 and 5. Data frames may be defined in a number of manners. For example, some systems may define a data frame 65 by using a data header 70 located at the beginning of each data frame. Alternatively, or in addition, some systems may define a frame 65 of data as the periodic occurrence of the number of symbols transmitted by the HE 25 over which a single iteration of an error checking routine (e.g., CRC, etc.) is performed at, for example, the receivers 50.

In each instance, the data frames 65 comprise defined bursts of symbols 80. Each burst 80 carries all of the symbols, numbering $X_M$, needed in a given frame period $T_{frame}$ by the receiver 50 of an RSU 30 so that the RSU may properly communicate with the HE 25 and/or perform its allocated function (e.g., cable telephony, etc.). As shown, all of the symbols $X_M$ for RSU #5 are transmitted in the fifth time slot of frame 65 of FIG. 4 while all of the symbols XM for RSU #18 are transmitted in the $18^{th}$ time slot of frame 65 of FIG. 4. Each of the time slots are of a duration $T_{burst}$.

Figure 6:
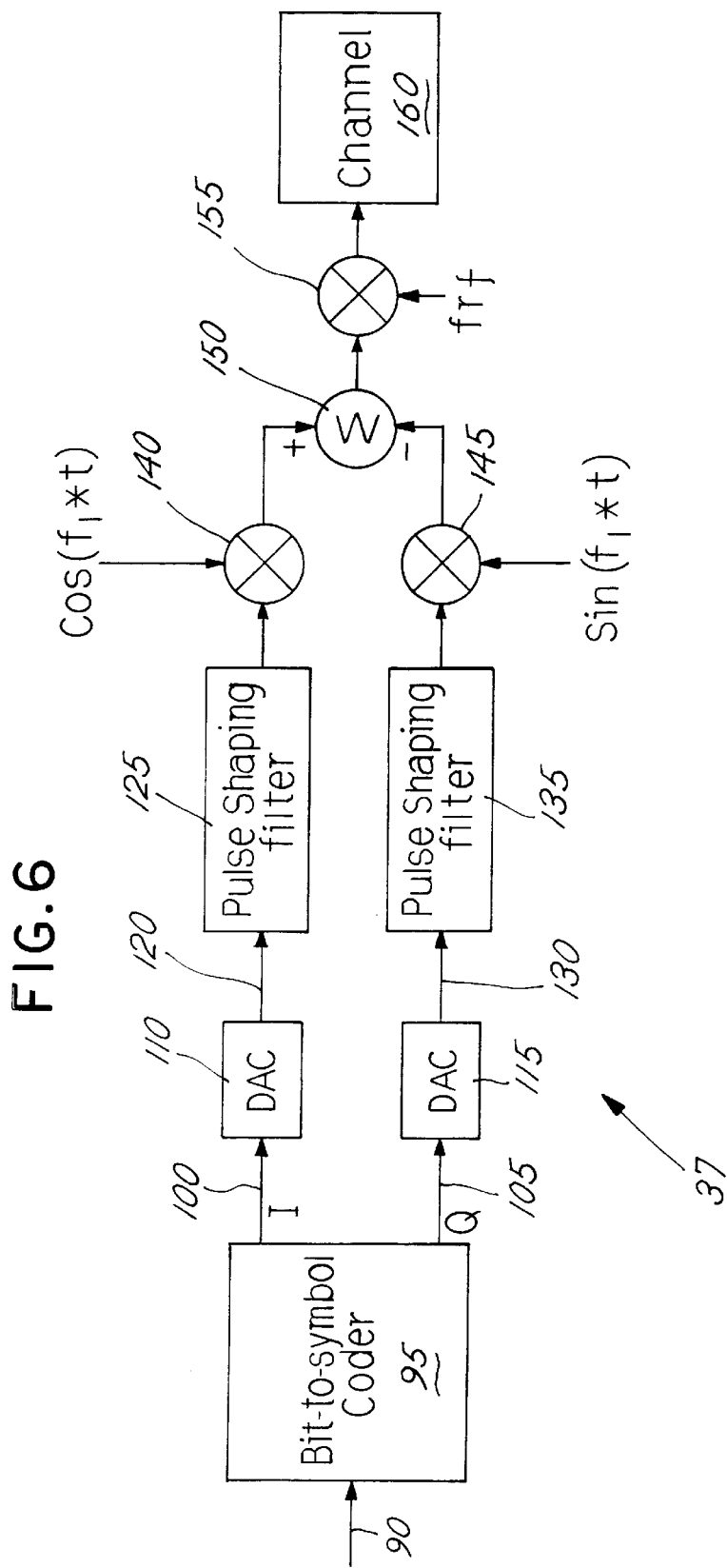
FIG. 6 is a schematic block diagram of an exemplary QAM transmitter for use at the head end unit.

A basic, exemplary QAM transmitter is illustrated generally at 37 of FIG. 6. As illustrated, a binary digital data stream is supplied at input 90 to a bit-to-symbol coder 95. When used at the HE 25, the binary data stream is supplied in a manner that generates the desired data frame format. The bit-to-symbol coder provides an in-phase component I on line 100 and a quadrature component Q on line 105. Both the I component and Q component are supplied to the input of respective digital-to-analog converters 110 and 115. The output 120 of the digital-to-analog converter 110 is supplied to the input of a first pulse shaping filter 125 (e.g., a square root of Nyquist filter) while the output 130 of the digital-to-analog converter 115 is supplied to the input of a second pulse shaping filter 135. The output of the pulse shaping filter 125 is subsequently modulated by the cosine of the base frequency $f_1$ of the signal constellation (see FIG. 3) while the output of pulse shaping filter 135 is subsequently modulated by the sine of the base frequency f1 of the constellation. This modulation occurs in modulator 140 and modulator 145, respectively. The resulting modulated signals are added to one another in summer circuit 150, after which the summed signal is further modulated by frequency $f_{rf}$ to an RF range by RF modulator 155. The RF signal is then transmitted on a transmission medium, represented here as channel 160. As previously noted, if the transmitter 35 is utilized in the head end unit 25, the transmitted signal is provided to the plurality of receivers respectively disposed at the RSUs 30 and is formatted in the manner described above.

Figure 7:
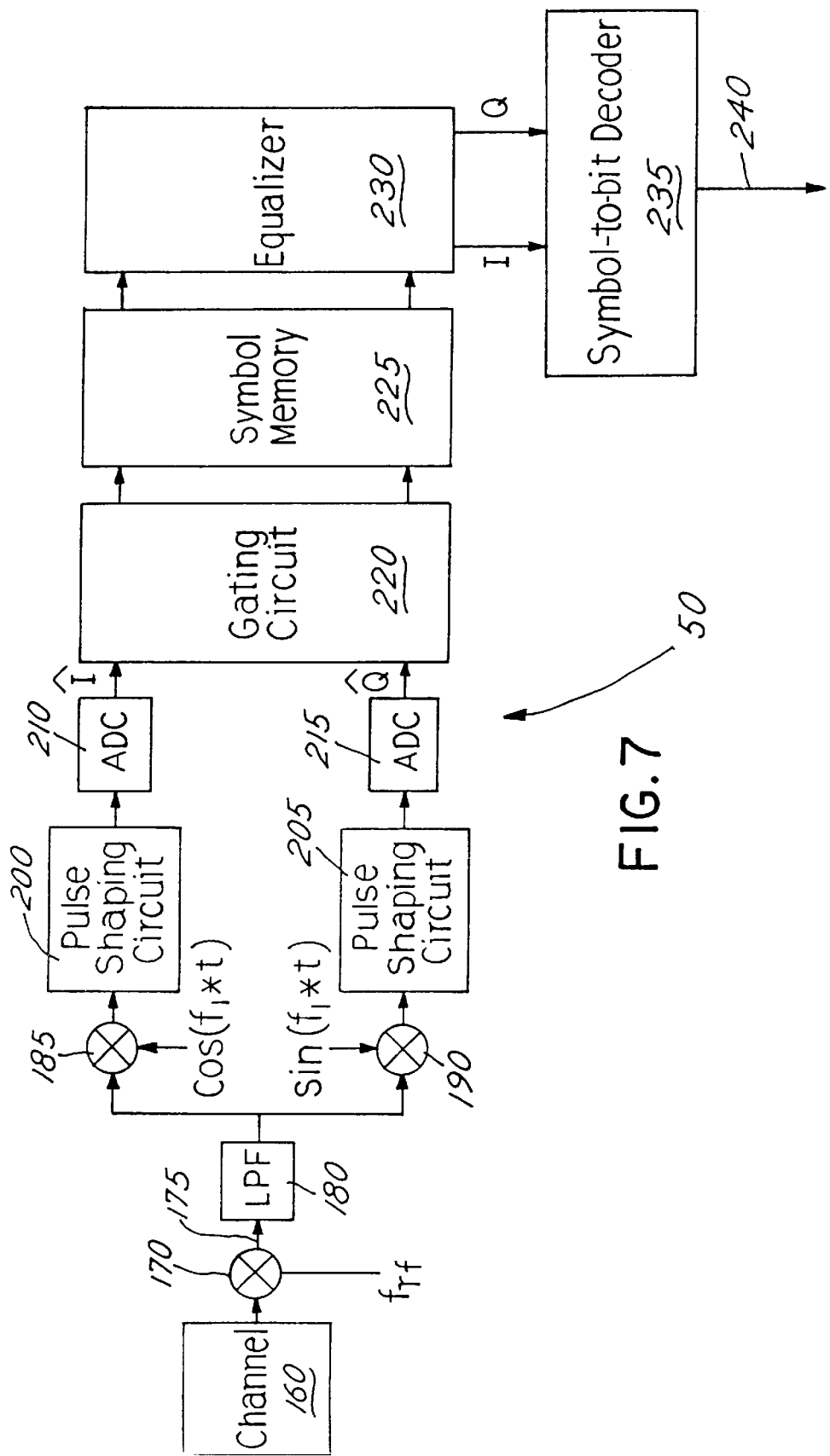
FIG. 7 is a schematic block diagram of an exemplary QAM receiver for use in the remote service units.

A basic, exemplary QAM receiver for an RSU 30 is shown generally at 50 of FIG. 7. As illustrated, the receiver 50 is connected to receive signals from the transmission medium or channel 160. The signals that are received therefrom are supplied to the input of an RF demodulator 170 that is set to the same frequency $f_{rf}$ as the RF modulator 155 of the transmitter 37. The demodulated signal is provided at output line 175 to the input of a low pass filter 180 which removes the high frequency image of the received signal, thereby leaving only the baseband signal for subsequent processing. It will be recognized that IF processing may be employed, but has been eliminated here for the sake of simplicity. The baseband signal is provided to the input of both demodulator 185 and demodulator 190. Demodulator 185 demodulates the baseband signal by multiplying it by $\cos(f_1*t)$ while demodulator 190 demodulates the baseband signal by multiplying it by $\sin(f_1*t)$. Each demodulated signal is subsequently passed through a respective pulse shaping filter 200 and 205 corresponding to the pulse shaping filters of the transmitter 37. Preferably, such filters correspond to "square root of Nyquist" filters as are conventionally used in such systems. The outputs of the filters 200 and 205 are provided to the inputs of respective analog-to-digital converters 210 and 215, respectively. The output signals from the analog-to-digital converters 210 and 215 corresponding to unequalized $\hat{I}$ and $\hat{Q}$ signals. The unequalized $\hat{I}$ and $\hat{Q}$ signals are supplied to the input of a gating circuit 220 that allows only those data samples intended for that particular receiver 50 to be stored in a subsequent memory 225. The data samples in the memory 225 are provided to the input of an adaptive equalizer 230 which provides equalized I and Q signals at its output which correspond to the I and Q signals at the transmitter 37. These I and Q signals are supplied to the input of a symbol-to-bit decoder 235 which converts the signals to a digital data stream output at one or more lines 240 corresponding to the digital data stream supplied to the input of the transmitter 37.

The adaptive equalizer is used to compensate for channel imperfections such as dispersion and multipath microreflections caused by impedance mismatches. It is designed to compensate for the non-flat frequency response of the channel by effectively inverting the channel response. Since the channel is often time-variant, the equalizer is designed to be adaptive. The rate of tap coefficient updates, and the tap adaptation algorithm (such as LMS) are chosen according to the time-varying characteristics of the channel. Depending on the symbol rate, constellation size, tap spacing, and channel characteristics, adaptive equalizers used in systems of the foregoing type typically have between 15 and 50 taps.

The adaptive equalizer 230 constitutes one of the most complex components of the receiver 50. It is generally implemented as an N-tap finite impulse response (FIR) filter. The number of taps N is determined by the impulse response of the channel 160 in that the equalizer 230 has to span at least a significant portion of the impulse response duration of the channel 160. The goal is to suppress intersymbol interference caused by the impulse response and, therefore, the span should be sufficient to achieve this goal.

Figure 8:
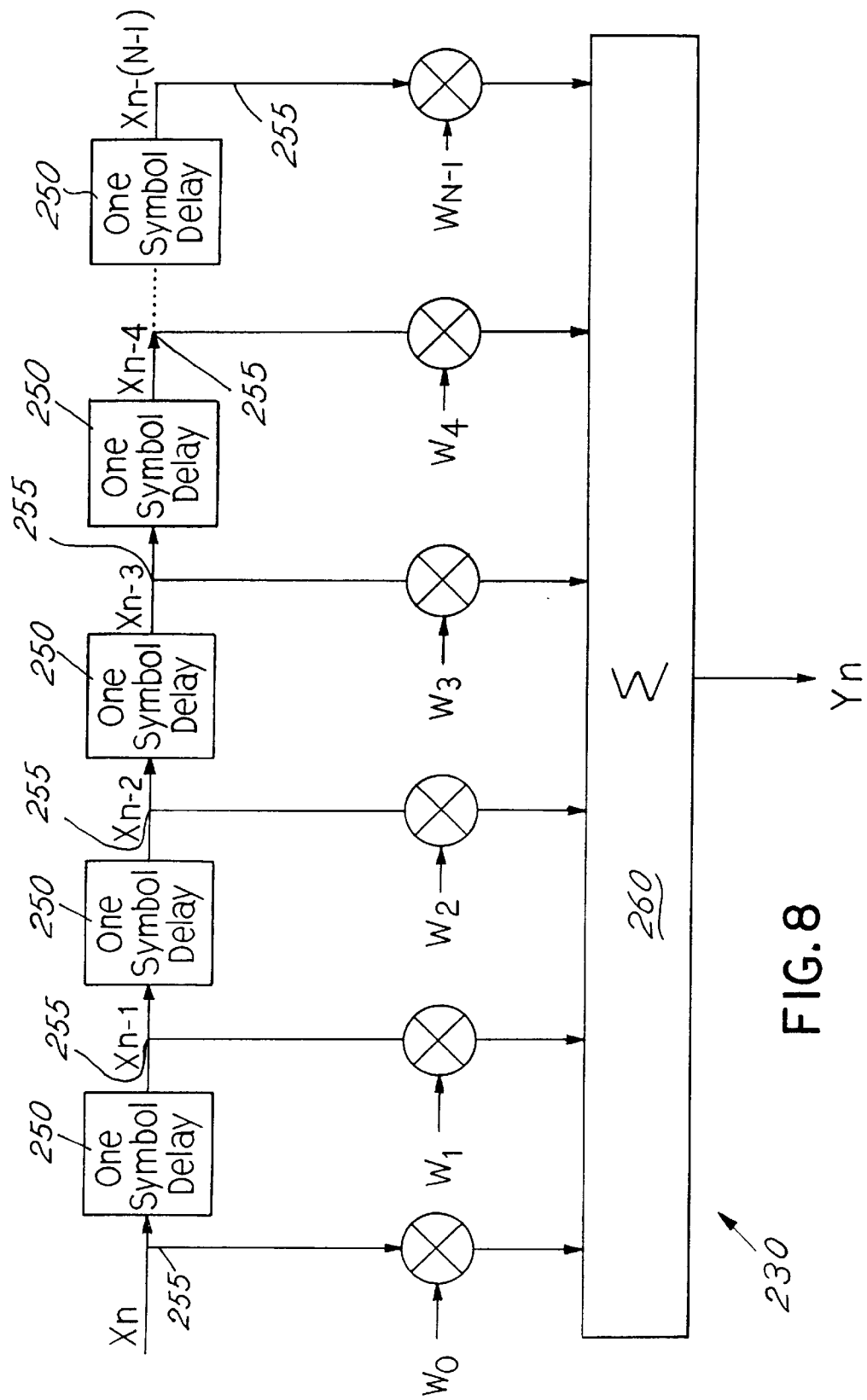
FIG. 8 is a schematic block diagram of one embodiment of an equalizer for use in the receiver of FIG. 7.

An exemplary embodiment of an adaptive equalizer 230 is illustrated in FIG. 8. The embodiment shown is an N-tap equalizer that utilizes delay circuits 250 corresponding to the length of a single symbol period $T_{sym}$. If the impulse response of the channel is of a duration P, then number of taps is typically selected according to the formula $N=P/T_{sym}$. It will be recognized that the delay circuits may be selected to each have a delay period less than a symbol period and, for example, may have delay periods of $½*T_{sym}$, $¼*T_{sym}$, etc. In such embodiments, the number of taps N would be selected accordingly and the sampling rate of the A/ID is correspondingly higher.

The adaptive equalizer 230 is of a conventional kind and sequentially accepts each of the I and Q outputs from the symbol memory 225. The current complex signal value input is shown here as a complex signal value input $X_n$ while the prior complex signal value inputs are designated as $X_{n-1}$, $X_{n-2}$, etc. The equalizer 230 accepts these signal inputs and provides a sequential stream of complex, equalized output signal values. In the illustration, the current complex, equalized output signal value is designated as $Y_n$. A plurality of taps 255 are separated from one another by the delay circuits 250 which, as noted above, correspond to a delay of a single symbol period $T_{sym}$ in this embodiment. The signal values $X_n$ are shifted through the filter symbol value by symbol value and each signal value is provided at each tap for multiplication by a corresponding complex tap coefficient $W_0$ through $W_{N-1}$. The complex tap coefficients $W_0$ through $W_{N-1}$ are changed over time depending on the characteristics of the channel 160. Such adaptive filter techniques are widely known and used. As such, they are omitted here for the sake of simplicity.

The output signal values resulting from the complex multiplications of the tap signal values and their respective tap coefficients are provided to the input of a summing circuit 260. The summing circuit 260 adds all of the values occurring during each symbol period together to generate a complex signal value output, represented here as $Y_n$. These values corresponds to equalized values of the I and Q values that are provided to the input of the symbol-to-bit decoder 235 of FIG. 7.

When the conventional data frame formats noted above are applied to the receiver 50 of a given RSU 30, the adaptive equalizer 230 of that receiver must process the burst for the RSU within a burst period $T_{burst}$ (see FIGS. 4 and 5). This is due to the fact that the adaptive equalizer 230 must process a continuous stream of data in order to function properly. As such, the adaptive equalizer 230 must incorporate a substantial amount of processing power.

An example of the processing of symbols received in a conventional data frame format will assist in understanding the amount of processing power required of the adaptive equalizer 230. With reference again to FIG. 4, we will make the following assumptions:

1. There are 32 RSUs in the system in communication with a single HE 25.
2. Each RSU requires 32 K symbols/sec to function properly.
3. There are 250 frames per second that are transmitted by the HE.

In view of the foregoing system parameters, it will be recognized that each RSU receives 128 symbols during each frame period $T_{frame}$. More particularly, each RSU receives 128 symbols in a 125 microsecond burst for each frame. As such, the adaptive equalizer 230 is forced to process 128 symbols in a time period of 125 microseconds. The adaptive equalizer 230 is then idle during a time period corresponding to the remaining 31 time slots, or 3875 microseconds, allocated to the other RSUs.

Such computational constraints render the adaptive equalizer 230 one of the most complex and costly components of a PSK receiver system. Within the demodulator architecture, it is not uncommon for the adaptive equalizer to occupy upwards of 40–50% of the silicon area.

Figure 9:
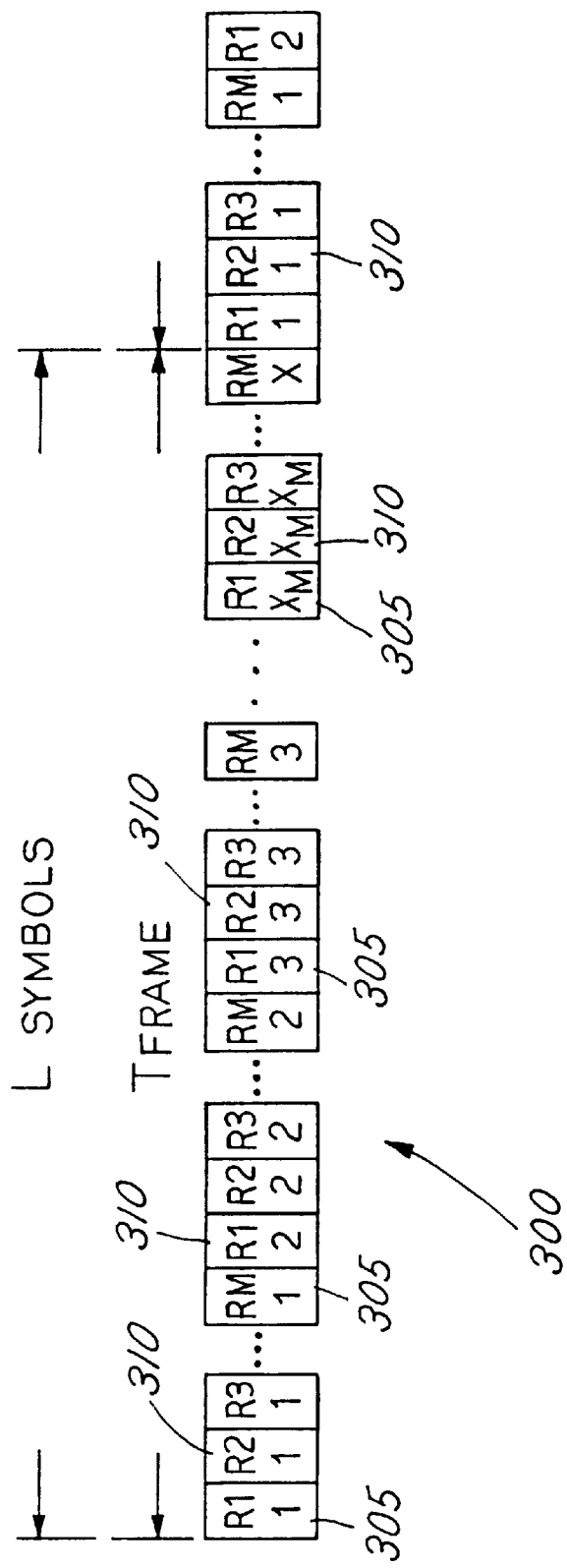
FIG. 9 illustrates one embodiment of an improved frame of data for transmission by the transmitter of FIG. 6 to the remote service units.

With reference to FIG. 9, the present inventors have invented a communications system that allows the adaptive equalizer 230 to carry out its processing operations in a distributed fashion over the entire duration of the frame period $T_{frame}$. To this end, the symbols that would otherwise be transmitted to an RSU as a single burst per frame are interleaved in a non-consecutive manner over the frame period $T_{frame}$ with symbols for the other RSUs. In the system, a plurality of RSUs numbering M, each having a receiver that is to receive symbols during a frame period are used. The transmitter at the HE transmits periodically occurring frames of data symbols to the plurality of receivers through the transmission medium. As illustrated, each frame of data contains L total symbols for the M receivers with a subset of $X_m$ symbols designated for each one of the M plurality of receivers. In most instances, $X_m$=int(L/M). The transmitter interleaves the $X_m$ symbols for a given remote receiver over the period of a frame into a plurality of periodic, non-consecutive groups of R symbols per group, wherein R<$X_m$.

If the constraints of the above-referenced example are used, $X_m$=128. Optimally, the system employs L groups with one symbol per group (R=1). As such, frame 300 is reorganized so that, for example, a receiver that received all 128 symbols in the first burst period 1 of FIG. 4 will now receive its data in single symbol time slots 305 of FIG. 9 that are periodic and non-consecutive over the duration of the frame $T_{frame}$. Similarly, a receiver that received all 128 symbols in the second burst period 2 of FIG. 4 will now receive its data in single symbol time slots 310 that are periodic and non-consecutive over the duration of the frame $T_{frame}$. As such, in the illustrated frame of FIG. 9, the first symbol for RSU #1 is transmitted in time slot R1,1. The first symbol for RSU#2 is transmitted in time slot R2,1, etc., until the first symbol for RSU #M (in the foregoing exemplary system, M=32) is transmitted in time slot RM, 1. Then the second symbol for RSU #1 is transmitted in time slot R1,2, etc., until each RSU 30 has received its entire complement of $X_m$ symbols at the end of $T_{frame}$.

The foregoing example described a system in which R=1. However, the following groupings may also be employed in the example when $X_m$=128 symbols:

1. The total symbols for each receiver $X_m$ during each frame period can be divided into two groups with 64 symbols each (R=64).
2. The total symbols for each receiver $X_m$ during each frame period can be divided into four groups with 32 symbols each (R=32).
3. The total symbols for each receiver $X_m$ during each frame period can be divided into 8 groups with 16 symbols each (R=16).
4. The total symbols for each receiver $X_m$ during each frame period can be divided into 16 groups with 8 symbols each (R=8).
5. The total symbols for each receiver $X_m$ during each frame period can be divided into 32 groups with 4 symbols each (R=4).
6. The total symbols for each receiver $X_m$ during each frame period can be divided into 64 groups with 2 symbols each (R=2).

In each of the foregoing examples, the value of R was chosen to be a power of two. Such symbol groupings tend to lend themselves more effectively to digital processing. However, it will be recognized that the foregoing examples are merely exemplary, and other groupings and corresponding R values may likewise be suitable in other system implementations.

Another manner of determining the burst length R is by selecting the maximum burst length R so that it may be economically implemented in relation to an adaptive equalizer having N taps. In order to determine the maximum value of R that is economical, it is observed that the receiver of the RSU needs to store N+R−1 consecutive demodulated symbols in memory (as gated by the gating circuit 220) when an N-tap adaptive equalizer is employed. One of the factors in the design of an RSU is the minimization of the total amount of memory required. As such, it is proposed to select R such that the memory overhead due to selection of a particular burst length is less than the mandatory memory required to store the minimum number (N) symbols for an N-tap equalizer. In other words, R is selected so that R−1<N or, in other words, R<N.

By employing the foregoing interleaving system, simpler RSU receivers become possible. This is particularly true of the adaptive equalizers employed in these receivers. As such, the foregoing system gives rise to significant cost and size savings.

Numerous modifications may be made to the foregoing system without departing from the basic teachings thereof. For example, the frame of FIG. 9 may include one or more data headers at the beginning of each data frame. Additionally, or in the alternative, the data frame 300 may be structured so that each receiver 50 is provided with enough symbols over $T_{frame}$ to execute a single error checking process (e.g., CRC or the like).

Although the present invention has been described in substantial detail with reference to one or more specific embodiments, those of skill in the art will recognize that changes may be made thereto without departing from the scope and spirit of the invention as set forth in the appended claims.

What is claimed:

1. A communications system comprising:
   a plurality of remote receivers numbering M for receiving and demodulating respective PSK symbols received from a transmission medium;
   a central transmitter transmitting periodically occurring frames of data to the plurality of receivers over the transmission medium, each frame of data having a header defining each frame, each frame of data containing L total symbols including a subset of $X_m$ symbols respectively designated for each one of the M plurality of remote receivers, the transmitter interleaving the $X_m$ symbols for a given remote receiver in a given frame into a plurality of periodic, non-consecutive groups of R symbols per group, wherein $R<X_m$.

2. A communications system as claimed in claim 1 wherein $X_m=\text{int}(L/M)$.

3. A communications system as claimed in claim 1 wherein the transmission medium is air.

4. A communications system as claimed in claim 1 wherein the transmission medium is a transmission line.

5. A communications system as claimed in claim 4 wherein the transmission medium is coaxial cable.

6. A communications system as claimed in claim 1 wherein $X_m=128$ symbols and $R \leq 64$ symbols.

7. A communications system as claimed in claim 1 wherein $R \leq 32$.

8. A communications system as claimed in claim 1 wherein $R \leq 16$.

9. A communications system as claimed in claim 1 wherein $R \leq 2$.

10. A communications system as claimed in claim 1 wherein $R=1$.

11. A communications system comprising:
    a plurality of remote receivers numbering M for receiving and demodulating respective PSK symbols received from a transmission medium;
    a transmitter transmitting periodically occurring frames of data to the plurality of receivers through the transmission medium, each frame of data containing L total symbols with a subset of $X_m$ symbols designated respectively for each one of the M plurality of remote receivers, the transmitter interleaving the $X_m$ symbols for a given receiver in a given frame into a plurality of periodic, non-consecutive groups of R symbols per group, wherein $R<X_m$, the $X_m$ symbols being the number of symbols over which each one of the plurality of receivers conducts a single error checking routine.

12. A communications system as claimed in claim 11 wherein $X_m=\text{int}(L/M)$.

13. A communications system as claimed in claim 11 wherein the transmission medium is air.

14. A communications system as claimed in claim 11 wherein the transmission medium is a transmission line.

15. A communications system as claimed in claim 14 wherein the transmission medium is coaxial cable.

16. A communications system as claimed in claim 11 wherein $X_m=128$ symbols and $R \leq 64$ symbols.

17. A communications system as claimed in claim 11 wherein $R \leq 32$.

18. A communications system as claimed in claim 11 wherein $R \leq 16$.

19. A communications system as claimed in claim 11 wherein $R \leq 2$.

20. A communications system as claimed in claim 11 wherein $R=1$.

21. A communications system comprising:
    a plurality of remote receivers numbering M for receiving and demodulating respective PSK symbols received from a transmission medium, each of the plurality of receivers comprising a digital equalization filter having N taps;
    a transmitter transmitting periodically occurring frames of data to the plurality of receivers through the transmission medium, each frame of data containing L total symbols with a subset of $X_m$ symbols respectively designated for each one of the M plurality of remote receivers, the transmitter interleaving the $X_m$ symbols for a given receiver in a given frame into a plurality of periodic, non-consecutive groups of R symbols per group, wherein $R \leq N$.

22. A communications system as claimed in claim 21 wherein $X_m=\text{int}(L/M)$.

23. A communications system as claimed in claim 21 wherein the transmission medium is air.

24. A communications system as claimed in claim 21 wherein the transmission medium is a transmission line.

25. A communications system as claimed in claim 24 wherein the transmission medium is coaxial cable.

26. A communications system as claimed in claim 21 wherein $X_m=128$ symbols and $R \leq 64$ symbols.

27. A communications system as claimed in claim 21 wherein $R \leq 32$.

28. A communications system as claimed in claim 21 wherein $R \leq 16$.

29. A communications system as claimed in claim 21 wherein $R \leq 2$.

30. A communications system as claimed in claim 21 wherein $R=1$.

* * * * *